Aug. 7, 1956
P. PYLE
2,757,767
SAFETY RELEASE CLUTCH
Filed June 4, 1953
2 Sheets-Sheet 2
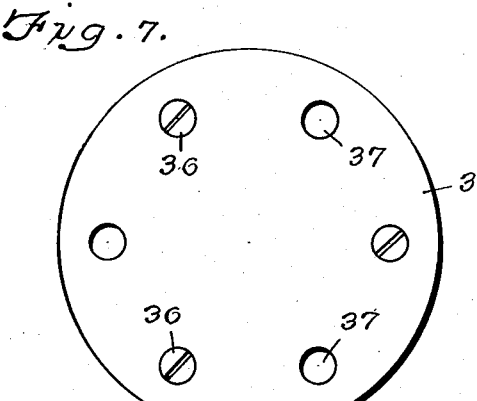
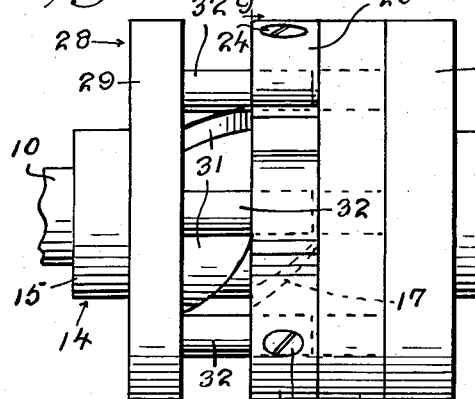
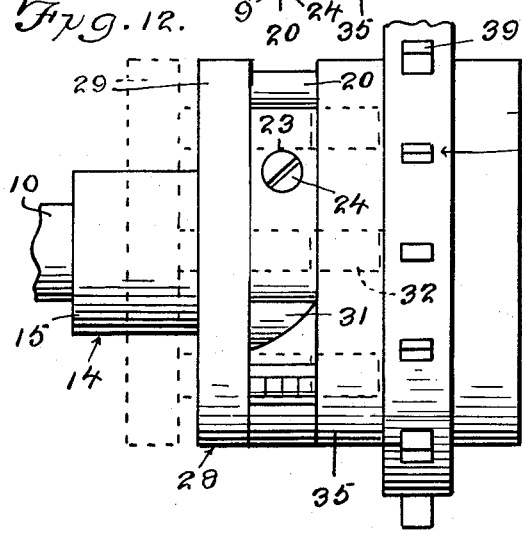
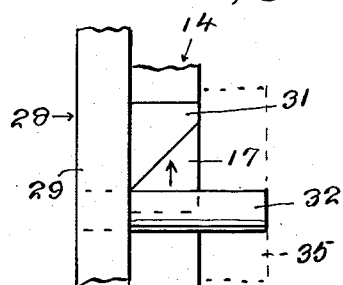
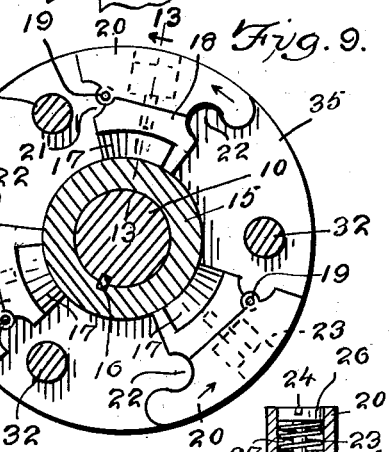
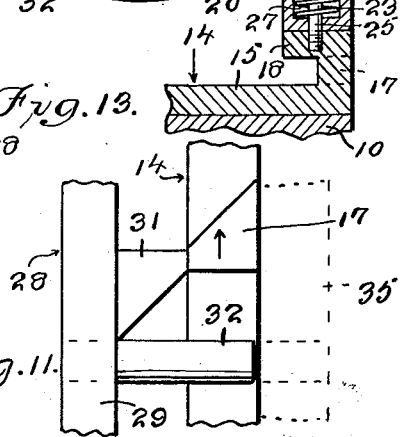
INVENTOR.
Patrick Pyle
BY Victor J. Evans & Co.
ATTORNEYS

United States Patent Office 2,757,767
Patented Aug. 7, 1956

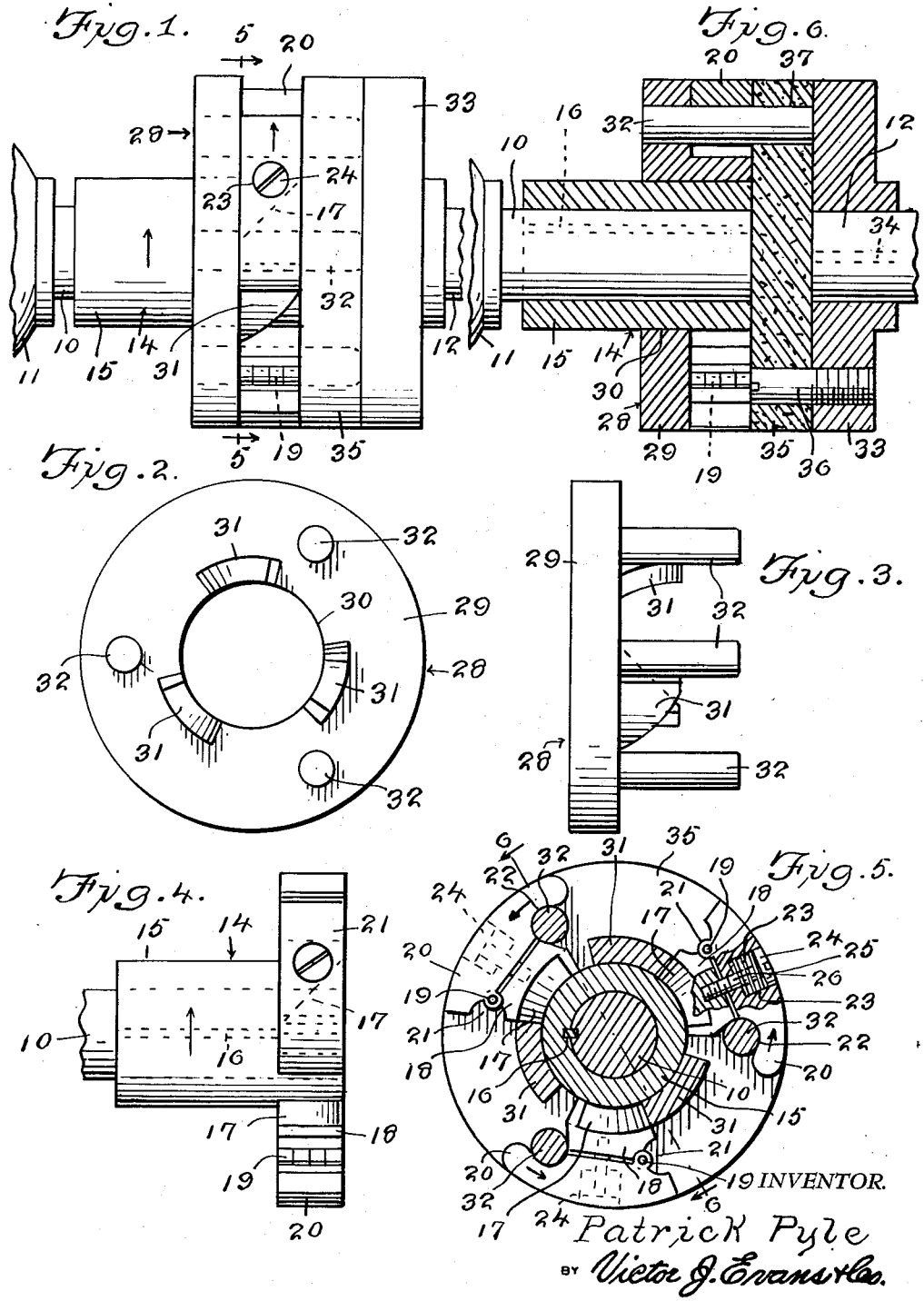

2,757,767
SAFETY RELEASE CLUTCH
Patrick Pyle, Grants Pass, Oreg.

Application June 4, 1953, Serial No. 359,528

2 Claims. (Cl. 192—56)

This invention relates to a coupling or clutch, and more particularly to a clutch that is adapted to be used between a drive and driven shaft.

The object of the invention is to provide a safety release clutch which will automatically release in the event that the load exceeds a predetermined limit whereby damage to the parts will be prevented.

Another object of the invention is to provide a safety release clutch which provides a safety coupling between a power source and any driven shaft or sprocket so that in the event the work or load becomes stalled, the clutch will be released to permit the motor to run freely so that there will be no breakage or damage to the motor or the work being done, the clutch being easily engaged again after the work is once more started.

A still further object of the invention is to provide a safety mechanism for use in connecting a motor and gear case so that in the event the work becomes suddenly stalled, the clutch will automatically release to permit the motor to run free and thereby prevent the breaking of chains or gears or burning out of the motor.

A further object of the invention is to provide a safety release clutch which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the clutch, showing the parts in operative driving relationship.

Figure 2 is an end elevational view of the disc member.

Figure 3 is a side elevational view of the disc member of Figure 2.

Figure 4 is a side elevational view of the body member having safety latches thereon.

Figure 5 is a sectional view taken on the line 5—5 of Figure 1.

Figure 6 is a sectional view taken on the line 6—6 of Figure 5.

Figure 7 is an end elevational view of the yieldable washer.

Figure 8 is a view similar to Figure 1, but showing the parts moved apart as when the load becomes stalled.

Figure 9 is a view similar to Figure 5, but showing the pins released from the safety latches as when the load is stalled.

Figure 10 is a fragmentary schematic view showing the cams and wedges in operative engagement.

Figure 11 is a view similar to Figure 10, but showing the position of the parts when the load is stalled and when the parts have moved apart or separated.

Figure 12 is a side elevational view showing a modified arrangement wherein a sprocket is driven instead of a pulley or belt arrangement.

Figure 13 is a sectional view taken on the line 13—13 of Figure 9.

Referring in detail to the drawings, the numeral 10 designates a drive shaft which may be connected to any suitable power source 11, and arranged in end to end relation with respect to the drive shaft 10 is a driven shaft 12, Figure 6. Mounted on the drive shaft 10 is a body member 14, Figure 4, and the body member 14 includes a cylindrical hub 15 that is secured to the drive shaft 10 by a key 16. Thus as the drive shaft 10 rotates, the body member 14 will rotate therewith.

The body member 14 is provided with a plurality of spaced cams 17, Figure 5, and arranged contiguous to each of the cams 17 is a lug 18. A pivot pin 19 serves to pivotally connect a safety latch or finger 20 to each of the lugs 18. Each of the sets of lugs 18 and latches 20 are provided with cooperating recesses 21, Figure 5, and 22, Figure 9, for a purpose to be later described. Each of the latches 20 is provided with a socket or cut-out 23, and a suitable securing element or screw 24 has a threaded stem 25 arranged in threaded engagement with each of the lugs 18. The head 26 of each of the screws 24 is seated in the cut-out 23, and a coil spring 27, Figure 13, is seated in the cut-out 23 and abuts the head 26. The coil springs 27 serve to normally urge or bias the latches 20 into closed position as shown in Figure 5.

The safety release clutch of the present invention further includes a disc indicated generally by the numeral 28 and shown in detail in Figures 2 and 3. The disc 28 includes a central circular portion 29 which is provided with a central opening 30 for rotatably receiving therein the hub 15 of the body member 14. Thus, the disc 28 is free to rotate on the hub 15 and is also free to slide back and forth on the hub 15. Formed integral with the disc 28 or secured thereto is a plurality of spaced wedges 31 which are adapted to coact with the cams 17 as later described in this application. Extending from the main portion 29 of the disc 28 is a plurality of spaced parallel pins 32, Figures 2 and 3.

Mounted on the driven shaft 12 is a collar 33, the collar 33 being connected to the driven shaft 12 by a key 34. A washer 35 which may be made of a suitable yieldable material such as leather, is arranged contiguous to the collar 33, and the washer 35 is secured to the collar 33 by suitable screws or pins 36, Figure 6. The washer 35 is provided with a plurality of holes or openings 37, Figure 7, and the openings 37 are adapted to receive the pins 32 when the parts are in operative driving relation as shown in Figures 1, 2 and 5. However, when the load on the driven shaft 12 becomes stalled, the pins 32 are forced or released from the openings 37 so that the drive shaft 10 is free to rotate while the driven shaft 12 remains stationary.

As shown in Figure 12 a sprocket 38 having teeth 39 thereon may be mounted on the driven shaft 12 or collar 33. The sprocket 38 may be provided with suitable teeth 39 for engaging a chain in the usual manner.

From the foregoing it is apparent that a safety release clutch has been provided. Normally the power source 11 drives the shaft 10 and the parts are in the position shown in Figures 1, 5 and 6. Thus, power is transmitted from the drive shaft 10 to the hub 15 of the body member 14 by means of the key 16. This rotation of the body member 14 causes rotation of the disc 28 since the pins 32 are received in the recesses 22 and it will also be seen that the ends of the pins 32 extend into the openings 37 in the yieldable washer 35. During this position the wedges 31 are arranged in engagement with the cams 17 as shown in Figure 10. However, in the event that the load on the driven shaft 12 becomes stalled or excessive, then the driven shaft 12 will stop rotating but the drive shaft 10 will be permitted to continue rotating. This is accomplished because when the driven shaft 12 stops, the springs 27 will permit the latches 20 to pivot slightly about the pins 19 so that the pins 32 can move from the position shown in Figure 5 to the position shown in Figure 9. Thus, with the pins 32 freed from the openings 37, the cams 17 will cause the wedges 31 to move or slide the disc 28 longitudinally along the hub 15 from the position shown in Figure 6 to the position shown in Figure 8. With the parts arranged as shown in Figure 8 the drive shaft 10 can be rotated by the power source 11 and the driven shaft 12 will not rotate since the pins 32 are not now in the openings 37 in the washer 35.

When it is desired that the driven shaft 12 again be rotated or driven by the drive shaft 10, it is only necessary to move the parts from the position shown in Figure 8 to the position shown in Figure 1 so that the pins 32 again are seated in the openings 37 in the washer 35. A suitable mechanism may be provided for reversing the clutch when necessary. The safety clutch of the present invention acts as a safety coupling between the power and any driven shaft or sprocket. When used as a coupling and when the parts are in driving relationship, the three pins 32 are in the openings 37 in the washer 35. Then, in case the sprocket 38 is used as shown in Figure 12, the sprocket 38 may be mounted on the collar 33. Also, a V-belt or pulley can be driven by the driven shaft if desired. As previously stated in the event that the work becomes stalled, the latches 20 release the pins 32 and continued rotation of the parts causes the cams 17 to lift the pins 32 from the openings 37 in the washer 35 to let the disc 28 turn freely with the drive shaft 10. Thus, there will be no breakage to the motor or the work being done. When the work is again started, it is only necessary to move the disc 28 until the pins 32 register with the holes or openings in the leather washer 35 then the pins can be placed in the holes by hand. The latches 20 serve to pull the load by keeping the disc member of Figure 3 from rotating relative to the latches but in the event a sudden overload occurs, the latches 20 are forced open by the pins 32. This lets the complete disc unit shown in Figure 3 turn and as this unit rotates, the wedges 31 in Figure 3 push against their corresponding parts in Figure 4 and thus pull the pins 32 out of the fabric coupler 35, so that the motor is free to turn without any friction at all.

Adjustments can be made for larger or smaller loads by changing the spring 27. Tightening or loosening on the spring 27 will also afford a small amount of adjustment. After being disengaged, the clutch can be again engaged by starting the pins 32 in the holes in the fabric coupler 35 and then rotating the unit shown in Figure 3 as it is pushed inward until the pins 32 snap under the latch 20. The clutch is now ready to again operate with no further adjustment. On a small motor this adjustment can be done by hand while on larger motors a spanner type wrench can be used.

If the latch 20 was not present, the complete function of the clutch would be lost since the lifts would rotate and pull the pins 32 out of the coupler 35 each time they were engaged without moving the work.

I claim:

1. In a safety release clutch for selectively connecting a driven shaft to a drive shaft, a body member including a cylindrical hub keyed to said drive shaft, a plurality of aligned cams extending from said hub, a plurality of lugs arranged in spaced relation with respect to said cams, a safety latch pivotally connected to each of said lugs, resilient means for normally urging said latches into locked position, there being a plurality of coacting recesses in said lugs and latches, a disc rotatably mounted on said hub, a plurality of wedges extending from said disc for coaction with said cams, a plurality of spaced parallel pins extending from said disc for seating in said recesses, a collar secured to said driven shaft, and a yieldable washer connected to said collar and provided with openings for receiving the pins extending from said disc.

2. In a safety release clutch for selectively connecting a driven shaft to a drive shaft, a body member including a cylindrical hub keyed to said drive shaft, a plurality of aligned cams extending from said hub, a plurality of lugs arranged in spaced relation with respect to said cams, a safety latch pivotally connected to each of said lugs, resilient means for normally urging said latches into locked position, there being a plurality of coacting recesses in said lugs and latches, a disc rotatably mounted on said hub, a plurality of wedges extending from said disc for coaction with said recesses, a collar secured to said driven shaft, a yieldable washer connected to said collar and provided with openings for receiving the pins extending from said disc, said resilient means comprising a securing element arranged in threaded engagement with said lugs, there being a socket in each of said latches, a head on said securing element seated in said socket, and a coil spring abutting each of said heads.

References Cited in the file of this patent

UNITED STATES PATENTS

| 1,879,486 | Rancke | Sept. 27, 1932 |
| 2,550,795 | Flaton | May 1, 1951 |